United States Patent
Biddick

[15] 3,647,543
[45] Mar. 7, 1972

[54] LOW-MAINTENANCE BATTERIES HAVING ELECTROLYTE RESERVOIR IN VAPOR CONTACT WITH THE CELLS

[72] Inventor: Royce E. Biddick, Edina, Minn.
[73] Assignee: Gould Inc., St. Paul, Minn.
[22] Filed: Nov. 14, 1969
[21] Appl. No.: 876,724

[52] U.S. Cl. ................................................136/6, 136/162
[51] Int. Cl. ..........................................................H01m 11/00
[58] Field of Search ........................136/162–163, 159–160, 136/166, 170, 169, 176, 177–178, 180, 161, 113–114, 6, 10, 87, 100, 26, 27; 137/260, 264, 388, 386, 68; 204/263

[56] References Cited

UNITED STATES PATENTS

| | | | |
|---|---|---|---|
| 3,141,795 | 7/1964 | Eisler | 136/6 |
| 3,488,220 | 1/1970 | Lyall et al. | 136/10 |
| 1,383,411 | 7/1921 | Longstreet | 136/162 |
| 3,207,631 | 9/1965 | Zaromb | 136/10 |
| 3,484,290 | 12/1969 | Knight | 136/6 |
| 3,537,902 | 11/1970 | Murata | 136/6 |
| 3,189,063 | 6/1965 | Lowe | 136/162 X |
| 3,159,508 | 12/1964 | Chreitzberg | 136/166 |

*Primary Examiner*—Anthony Skapars
*Attorney*—Stryker and Jacobson

[57] ABSTRACT

A low-maintenance lead acid pile battery is disclosed in which a reservoir of water or electrolyte is positioned in vapor contact with the cells. A porous nonconductive member separates the reservoir from the cells but permits vapor diffusion therethrough to replenish water lost due to evaporation and electrolysis. The porous member also permits oxygen transfer from the positive plates to the negative plates of the battery.

7 Claims, 2 Drawing Figures

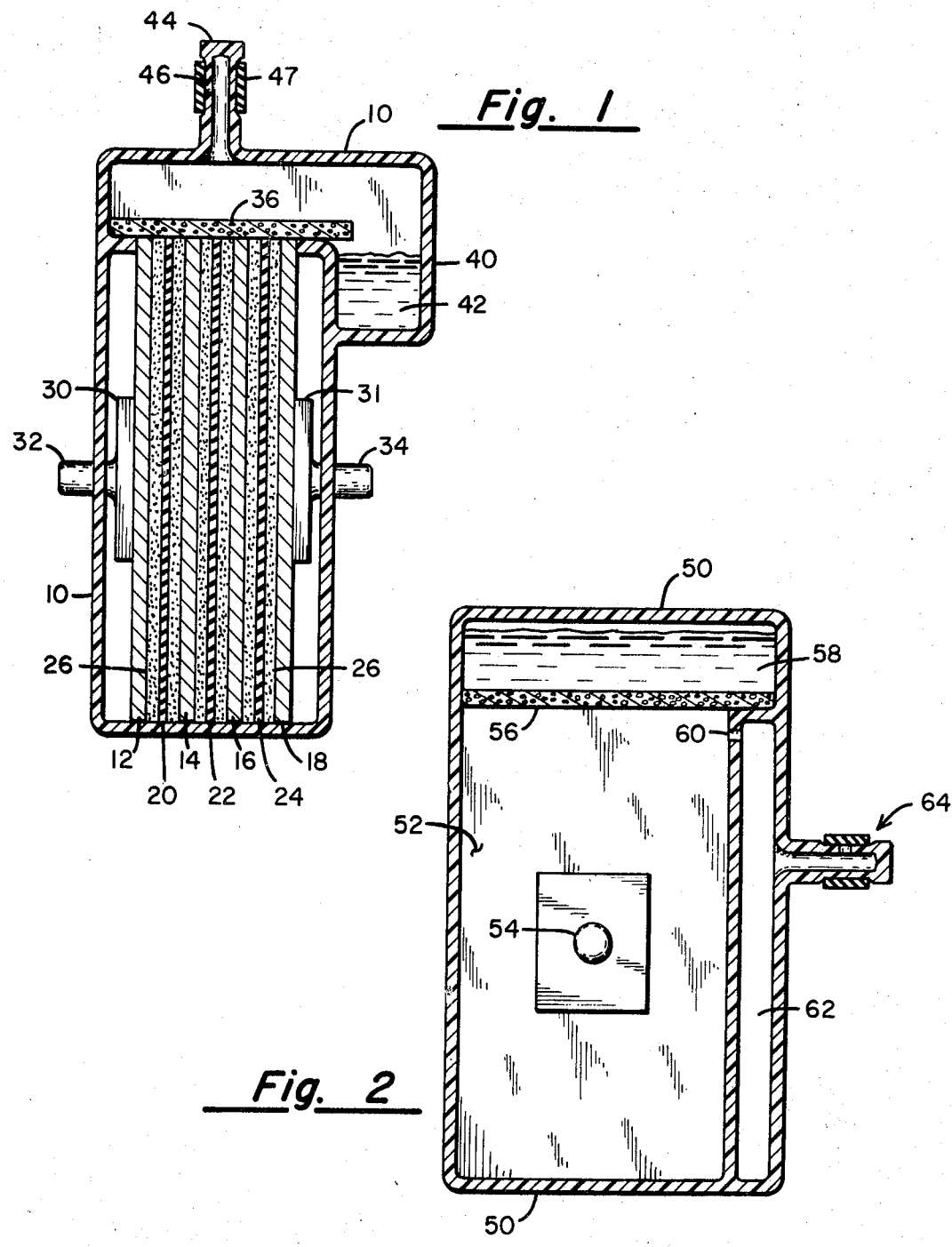

LOW-MAINTENANCE BATTERIES HAVING ELECTROLYTE RESERVOIR IN VAPOR CONTACT WITH THE CELLS

BACKGROUND OF THE INVENTION

High-output lead acid pile batteries comprise a stack of thin bipolar lead plates with electrolyte and conducting spacers between them. Each plate has a coating of lead dioxide on one side and a layer of sponge lead on the other side. The plates are carefully sealed at the edges to eliminate any liquid paths which would cause short circuits between adjacent cells. A problem encountered in the operation of these cells is the necessity to add water to each cell to make up for water losses caused by electrolytic decomposition of water and by evaporation. Conventional lead-acid batteries may be semisealed in order to achieve a low-maintenance characteristic. To this end the electrolyte is gelled or absorbed on some type of material to prevent spillage and the battery is vented by means of a one way valve which allows gas and water vapor to escape only when the pressure inside the cells exceeds a certain predetermined level, thus conserving electrolyte. Usually, provision is made for the oxygen generated within the battery to be recombined with the lead, thus conserving oxygen. If less gas escapes into the atmosphere water loss is further reduced. To recombine oxygen it is necessary to transfer oxygen from the positive plate where it is formed upon charging of the battery to the negative plate where it can react with the lead. In the conventional low-maintenance battery cell oxygen migrates to the negative electrode across the tops of the electrodes, around the edges of the plates, and through open pores in the separators. However, in a pile battery, the separators should normally be completely saturated with electrolyte so as to provide maximum conductivity and consequently, that oxygen transfer path is blocked. Furthermore, since the plates and separators are sealed around the edges, the oxygen cannot migrate across that route either. My invention solves the above mentioned problems and therefore provides a much lower maintenance pile battery.

SUMMARY OF THE INVENTION

Briefly, my invention comprises positioning one side of a porous nonconductive member in vapor contact with the cells of the battery and positioning a water or electrolyte reservoir in vapor contact with the opposite side of the porous member. In this way, the electrolyte is blocked but oxygen can migrate through the porous member to the negative plate surfaces. Furthermore, any decrease in the vapor pressure in the cells caused by the evaporation or electrolysis of water serves to draw vapor from the reservoir through the porous member into the battery cells to replenish the lost water. Consequently, it is an object of my invention to provide a lower maintenance lead acid pile battery. It is another object of the present invention to provide a gas passageway around the edge of the plates and separators in a pile-type battery. Still another object of the present invention is to provide a means of replenishing water to the cells of the pile battery to compensate for unpreventable water losses. Further objects and advantages will become apparent to those skilled in the art upon consideration of the following drawing and description.

BRIEF DESCRIPTION OF THE DRAWING

FIG. 1 is a sectional side view of a lead acid pile battery showing one possible arrangement of the reservoir and porous member.

FIG. 2 is a sectional end view of another possible embodiment of my invention utilizing separate gas discharge and reservoir chambers.

DESCRIPTION OF THE PREFERRED EMBODIMENT

In FIG. 1 a battery housing 10 is sectionally shown which contains four battery plates, 12, 14, 16 and 18. Any number of plates may be used and four are shown only for the sake of clarity. Situated between the battery plates are three conducting separators 20, 22 and 24. Each of the separators is immersed in and saturated with a suitable electrolyte 26 which is contained between the plates. Preferably this electrolyte is gelled. Connected to plates 12 and 18 are a pair of contact plates 30 and 31 to which a pair of terminals 32 and 34 are connected. Plates 14 and 16 comprise bipolar electrodes constructed from thin sheets of lead with a layer of lead dioxide on one side and a layer of sponge lead on the other side. Plates 12 and 18 comprise monopolar plates, one having only a layer of sponge lead and the other having only a layer of lead dioxide. The current path in the battery is from one terminal through the plates, electrolyte, and separators to the other terminal. The chemistry involved in this type of battery is well known in the prior art and, thus, will not be discussed in detail herein. The well-known chemical reactions involved generate oxygen at the positive sides of the plates in the battery during charging. To reduce the emission of this gas from the battery it is desirable to recombine the oxygen with the lead on the negative side of the plates. However, since the positive and negative sides of the plates are separated by a fully saturated separator the oxygen is blocked from making this transfer. My invention solves this problem by using a porous nonconductive material member 36 to form one wall of the chamber containing the battery plates. Porous member 36 may comprise a number of suitable hydrophobic porous materials including porous fluorinated plastics. Porous fluorinated plastics such as polytetrafluoroethylene have been found to work particularly well and are used in the preferred embodiment. Porous member 36 permits gases to pass therethrough so that the oxygen can travel through member 36 to the negative sides of the plates where it can react with the lead and recombine. The amount of gas which escapes is thus lessened and accordingly there is less electrolytic decomposition and less vapor loss. However, normal battery operation requires a certain minimum amount of electrolysis which cannot be prevented. As a result all batteries require the addition of at least some water periodically. To replace this unpreventable loss of water a reservoir 40 is provided on the battery to contain additional water or electrolyte 42. Since the space between the plates is small even a modest reservoir will greatly increase the electrolyte capacity of the battery insuring only minor long term changes in electrolyte consistency due to evaporation and electrolysis.

Reservoir 40 is in vapor contact with porous member 36. When the water level in the battery cells is depleted the electrolyte becomes more concentrated and the water vapor partial pressure above the cells decreases. The higher water vapor pressure in the reservoir chamber induces water vapor to diffuse through the porous member 36 into the battery cells until the system is balanced thus replenishing and maintaining the water level in the battery. Preferably the liquid composition in the reservoir is chosen to be similar to that desired in the battery cell so that water diffuses into the cells only as they become depleted in water by the process of electrolysis. To this end the same electrolyte is preferably used in the battery and in the reservoir. It should be noted that the porous member 36 is relatively impervious to liquid and thus there is no leakage from the battery to the reservoir or from the reservoir to the battery when the unit is tilted or upset.

During charging of the battery the gas generated rises to an unacceptable level and must be discharged. To relieve this condition a vent is provided which allows the escape of gases if the pressure exceeds a predetermined level. A closed tube 44 with a hole 46 is sealed by means of a rubber sleeve 47. This one way valve prevents any loss of water vapor or oxygen from the battery due to normal operation but does release excessive pressures from the battery as encountered during charging.

When operating the inner portions of the battery become quite warm. The higher temperature of the battery tends to drive water vapor from the electrolyte into the cooler reservoir. To compensate for this effect the design of the preferred embodiment shown in FIG. 1 is such that the reservoir is in close physical contact with the battery. The reservoir remains therefore at a temperature close to that of the battery. If desired, this effect may be even further minimized by the use of suitable heat insulating materials about the reservoir area.

In FIG. 2 another embodiment of the present invention is shown. In FIG. 2 a battery housing 50, plates 52, and terminal post 54 are shown from an end view. A porous member 56 is shown positioned above the battery plates with a water reservoir 58 resting directly on top of the porous member. Since the porous member is impervious to liquid, only the water vapor can pass from reservoir 58 into the respective cells among the plates in response to any loss in the vapor pressure therein. Venting of excess gases takes place through small holes 60 into a common chamber 62 and thence into the atmosphere by means of a one way valve 64 similar to the valve described with respect to FIG. 1. It is clear that the number of variations in the arrangement of the reservoir, porous member, and venting valves are so numerous that they cannot be shown or described in detail herein and thus I should not be bound to the particular embodiments shown or described except as defined by the appended claims.

I claim:

1. Apparatus of the class described comprising in combination:
    a pile battery formed from a plurality of chemically active generally flat similar plates stacked in a generally parallel manner so that the edges of said plates are in approximate alignment;
    housing means sealing the edges of said plates and forming sealed electrolyte containing cells between the plates, a portion of said housing means which extends over said cells being formed from a gas and water vapor permeable material permitting the migration of gas and water vapor among the cells, said housing means further comprises a reservoir portion adjacent said gas and water vapor permeable material storing an aqueous solution in vapor contact with said gas permeable housing portion.

2. The apparatus of claim 1 in which said gas permeable material comprises porous fluorinated plastic.

3. The apparatus of claim 1 including an aqueous solution in said reservoir of composition similar in the ratio of water content to the electrolyte in said cells.

4. The apparatus of claim 1 including venting means connected to said cells permitting the release of gases from said cells when the pressure in said cells exceeds a predetermined value.

5. The apparatus of claim 4 in which said venting means is positioned in said reservoir portion and connected to said cells by means of said gas permeable housing portion.

6. The apparatus of claim 4 in which said gas permeable material comprises porous fluorinated plastic.

7. The apparatus of claim 6 in which said gas permeable member is constructed from porous polytetrafluoroethylene.

* * * * *